(12) United States Patent
Zhou

(10) Patent No.: US 9,356,471 B2
(45) Date of Patent: May 31, 2016

(54) POWER SUPPLY CIRCUIT

(71) Applicant: ScienBiziP Consulting (Shen Zhen) Co., Ltd., Shenzhen (CN)

(72) Inventor: Hai-Qing Zhou, Shenzhen (CN)

(73) Assignee: ScienBiziP Consulting(Shenzhen)Co., Ltd, Shenzhen (CN)

( * ) Notice: Subject to any disclaimer, the term of this patent is extended or adjusted under 35 U.S.C. 154(b) by 233 days.

(21) Appl. No.: 14/251,667

(22) Filed: Apr. 14, 2014

(65) Prior Publication Data
US 2014/0306536 A1 Oct. 16, 2014

(30) Foreign Application Priority Data

Apr. 15, 2013 (CN) .......................... 2013 1 01286938

(51) Int. Cl.
H02J 1/10 (2006.01)
H02J 9/06 (2006.01)
H02M 1/32 (2007.01)
H02M 3/156 (2006.01)

(52) U.S. Cl.
CPC ................. *H02J 9/061* (2013.01); *H02M 1/32* (2013.01); *H02M 3/156* (2013.01); *H02J 2009/068* (2013.01); *Y10T 307/549* (2015.04)

(58) Field of Classification Search
CPC ..... H02J 9/061; H02J 2009/068; H02M 1/32; H02M 3/156; H10T 307/546
USPC ........................................... 307/52
See application file for complete search history.

(56) References Cited

U.S. PATENT DOCUMENTS

| 7,030,596 | B1 * | 4/2006 | Salerno | ................. | H02M 3/158 323/282 |
| 8,917,076 | B2 * | 12/2014 | Hsing | ....................... | G05F 1/56 323/271 |
| 2010/0124084 | A1 * | 5/2010 | Chang | ..................... | H02M 1/32 363/95 |

* cited by examiner

Primary Examiner — Rexford Barnie
Assistant Examiner — Toan Vu
(74) Attorney, Agent, or Firm — Novak Druce Connolly Bove + Quigg LLP

(57) ABSTRACT

Power supply circuit comprises an under voltage protection module and a voltage conversion module electrically connected to the under voltage protection module. The under voltage protection module is electrically connected to a first power supply and a second power supply. The voltage conversion module is connected to the first power supply. When a voltage of the first power supply is in a normal range, the under voltage protection module offers the second power supply to power the voltage conversion module. The voltage conversion module converts the voltage of the first power supply into an operational voltage, and outputs the operational voltage. When the voltage of the first power supply is less than a threshold voltage, the under voltage protection module does not offer the second power supply to the voltage conversion module, and the voltage conversion module does not operate.

7 Claims, 1 Drawing Sheet

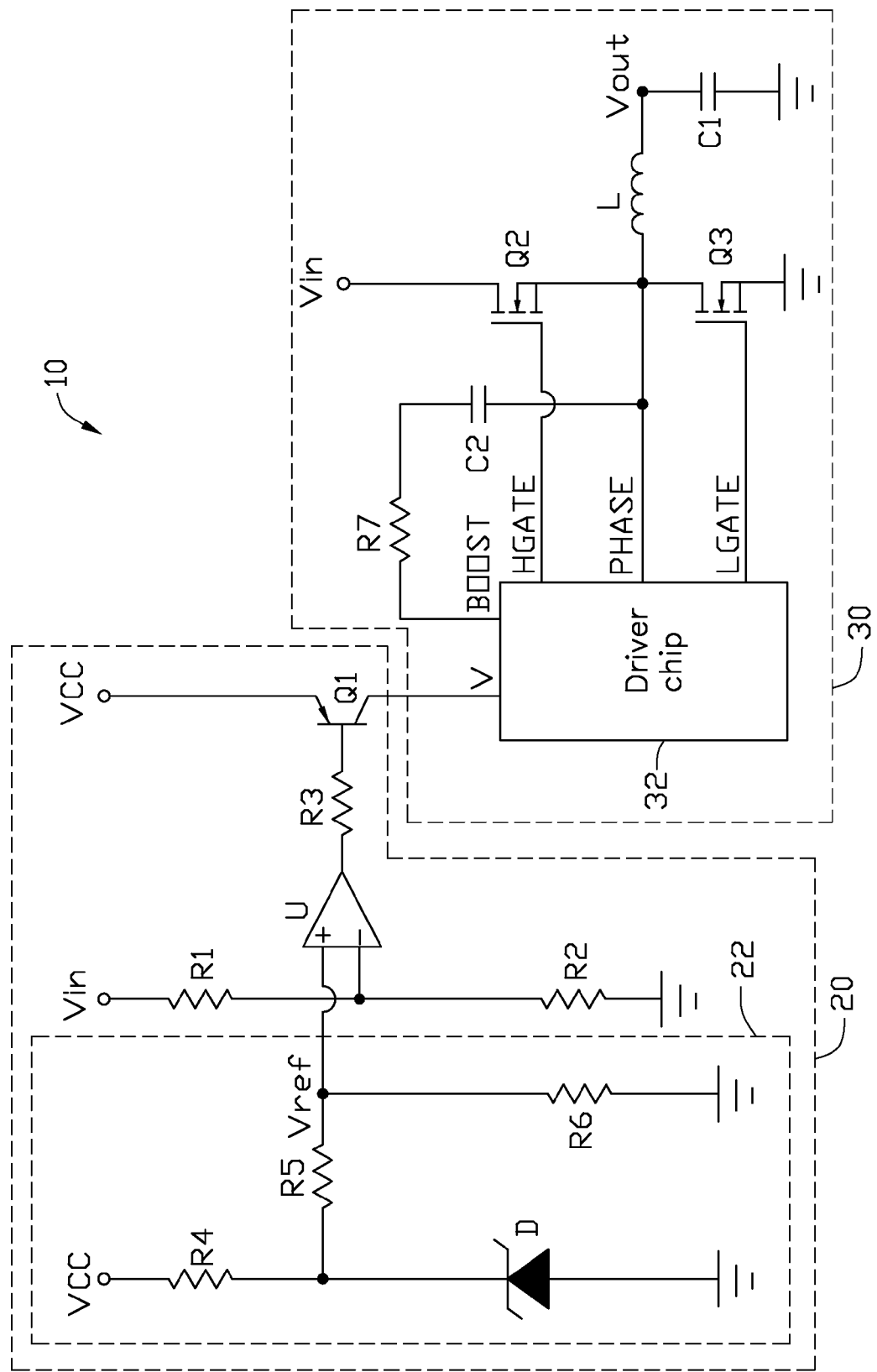

POWER SUPPLY CIRCUIT

FIELD

The present disclosure relates to a power supply circuit.

BACKGROUND

Electronic devices, such as computers and servers, are powered by a power supply.

BRIEF DESCRIPTION OF THE DRAWING

Many aspects of the present disclosure can be better understood with reference to the following drawing. The components in the drawing are not necessarily drawn to scale, the emphasis instead being placed upon clearly illustrating the principles of the present embodiments.

The FIGURE is a circuit diagram of an embodiment of a power supply circuit.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references can mean "at least one."

The figure shows an embodiment of a power supply circuit 10. The power supply circuit 10 comprises an under voltage protection module 20 and a voltage conversion module 30. The voltage conversion module 30 is electrically connected to the under voltage protection module 20.

The under voltage protection module 20 comprises a comparator U, a first electronic switch Q1, a voltage stabilizing unit 22, and three resistors R1-R3. The comparator U comprises a non-inverting terminal, an inverting terminal, and an output terminal The first electronic switch Q1 comprises a first terminal, a second terminal, and a third terminal The non-inverting terminal of the comparator U is electrically connected to the voltage stabilizing unit 22, to receive a reference voltage Vref from the voltage stabilizing unit 22. The inverting terminal of the comparator U is electrically connected to a first power supply Vin through the resistor R1, and is electrically connected to a ground through the resistor R2. The output terminal of the comparator U is electrically connected to the first terminal of the first electronic switch Q1 through the resistor R3. The second terminal of the first electronic switch Q1 is electrically connected to a second power supply VCC. The third terminal of the first electronic switch Q1 is electrically connected to the voltage conversion module 30.

The voltage stabilizing unit 22 comprises a Zener diode D and three resistors R4-R6. An anode of the Zener diode D is electrically connected to a ground. A cathode of the diode D is electrically connected to the second power supply VCC through the resistor R4, and is electrically connected to a ground through the resistor R5 and the resistor R6 in that order. A node between the resistor R5 and the resistor R6 functions as an output terminal of the voltage stabilizing unit 22, and outputs the reference voltage Vref to the non-inverting terminal of the comparator U.

The voltage conversion module 30 comprises a driver chip 32, a second electronic switch Q2, a third electronic switch Q3, an inductor L, two capacitors C1 and C2, and a resistor R7. The driver chip 32 comprises a first control pin HGATE, a second control pin LGATE, a phase pin PHASE, a bootstrap pin BOOST, and a power pin V. Each of the second electronic switch Q2 and the third electronic switch Q3 comprises a first terminal, a second terminal, and a third terminal The first terminal of the second electronic switch Q2 is electrically connected to the first control pin HGATE of the driver chip 32. The second terminal of the second electronic switch Q2 is electrically connected to the first power supply Vin. The third terminal of the second electronic switch Q2 is electrically connected to a ground through the inductor L and the capacitor C1 in that order. The first terminal of the third electronic switch Q3 is electrically connected to the second control pin LGATE of the driver chip 32. The second terminal of the third electronic switch Q3 is electrically connected to the third terminal of the second electronic switch Q2. The third terminal of the third electronic switch Q3 is electrically connected to a ground. A node between the inductor L and the capacitor C1 functions as the output terminal of the voltage conversion module 30, and outputs an operational voltage Vout. The power pin V of the driver chip 32 is electrically connected to the third terminal of the first electronic switch Q1. The bootstrap pin BOOST of the driver chip 32 is electrically connected to the phase pin PHASE of the driver chip 32 through the resistor R7 and the capacitor C2 in that order. The phase pin PHASE of the driver chip 32 is electrically connected to the third terminal of the second electronic switch Q2.

In use, a voltage at the cathode of the Zener diode D stays unchanged, and divided by the resistors R5 and R6. A voltage of the resistor R6 is the reference voltage Vref. When a voltage of the first power supply Vin is in a normal range, which can be for example 10.8V-13.2V, a voltage at the inverting terminal of the comparator U is greater than the reference voltage Vref. The output terminal of the comparator U outputs a low level signal, such as logic 0. The first electronic switch Q1 is turned on. The driver chip 32 is powered by the second power supply VCC through the first electronic switch Q1, and begins to operate.

When the driver chip 32 operates, the first control pin HGATE and the second control pin LGATE of the driver chip 32 alternately output high-level signals to alternately turn on the second electronic switch Q2 and the third electronic switch Q3. When the first control pin HGATE outputs a high-level signal, such as logic 1, and the second control pin LGATE outputs a low-level signal, such as logic 0, the second electronic switch Q2 is turned on, and the third electronic switch Q3 is turned off. The inductor L and the capacitor C1 are charged by the first power supply Vin through the second electronic switch Q2. When the first control pin HGATE outputs a low-level signal, and the second control pin LGATE outputs a high-level signal, the second electronic switch Q2 is turned off, and the third electronic switch Q3 is turned on. The inductor L and the capacitor C1 are discharged through the third electronic switch Q3. The output terminal of the voltage conversion module 30 can then output the operational voltage Vout.

When the voltage of the first power supply Vin is less than a threshold voltage (that is a under-voltage protection voltage), which can be for example 10.8V, because of short-circuit or other reasons, the voltage at the inverting terminal of the comparator U is less than the reference voltage Vref. The output terminal of the comparator U outputs a high level signal, such as logic 1. The first electronic switch Q1 is turned off The driver chip 32 is not powered by the second power supply VCC, and does not operate. The output terminal of the voltage conversion module 30 does not output the operational voltage Vout. Therefore, electronic devices, such as computers and servers, powered by the power supply circuit 10, will not be damaged.

In at least one embodiment, the threshold voltage can be adjusted by adjusting resistances of the resistors R1 and R2. In at least one embodiment, the first electronic switch Q1 can be a pnp-type bipolar junction transistor (BJT), and the first terminal, the second terminal, and the third terminal of the first electronic switch Q1 correspond to a base, an emitter, and a collector of the pnp-type BJT, respectively. The second electronic switch Q2 and the third electronic switch Q3 can be an n-channel metal-oxide semiconductor field-effect transistor (NMOSFET), and the first terminal, the second terminal, and the third terminal of each of the second electronic switch Q2 and the third electronic switch Q3 correspond to a gate, a drain, and a source of the NMOSFET, respectively. In other embodiments, the first electronic switch Q1 may be a p-channel metal-oxide semiconductor field-effect transistor or other suitable switch having similar functions. Each of the second electronic switch Q2 and the third electronic switch Q3 may be an npn-type BJT or other suitable switch having similar functions.

As detailed above, the under voltage protection module 20 enables the voltage conversion module 30 to operate, when the voltage of the first power supply Vin is in the normal range. And, the under voltage protection module 20 stops the voltage conversion module 30 from operating, when the voltage of the first power supply Vin is less than the threshold voltage. Therefore, an under voltage protection function of the power supply circuit 10 can be achieved.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power supply circuit comprising:
   a voltage conversion module electrically connected to a first power supply; and
   an under voltage protection module comprising:
      a first resistor and a second resistor;
      a voltage stabilizing unit to output a reference voltage;
      a comparator comprising a non-inverting terminal electrically connected to the voltage stabilizing unit to receive the reference voltage, an inverting terminal electrically connected to the first power supply through the first resistor and electrically connected to a ground through the second resistor, and an output terminal; and
      a first electronic switch comprising a first terminal electrically connected to the output terminal of the comparator, a second terminal electrically connected to a second power supply, and a third terminal electrically connected to the voltage conversion module;
   wherein in response to a voltage of the first power supply being in a normal range, a voltage at the inverting terminal of the comparator is greater than the reference voltage, the output terminal of the comparator outputs a low-level signal, the first electronic switch is turned on, the voltage conversion module is powered by the second power supply through the first electronic switch, and the voltage conversion module converts the voltage of the first power supply into an operational voltage and outputs the operational voltage; and
   wherein in response to the voltage of the first power supply being less than a threshold voltage, the voltage at the inverting terminal of the comparator is less than the reference voltage, the output terminal of the comparator outputs a high-level signal, the first electronic switch is turned off, and the voltage conversion module does not operate.

2. The power supply circuit of claim 1, wherein the voltage conversion module comprises:
   an inductor;
   a first capacitor;
   a driver chip comprising a first control pin, a second control pin, and a power pin electrically connected to the third terminal of the first electronic switch;
   a second electronic switch comprising a first terminal electrically connected to the first control pin of the driver chip, a second terminal electrically connected to the first power supply, and a third terminal electrically connected to a ground through the inductor and the first capacitor in that order;
   a third electronic switch comprising a first terminal electrically connected to the second control pin of the driver chip, a second terminal electrically connected to the third terminal of the second electronic switch, and a third terminal electrically connected to a ground;
   wherein a node between the inductor and the first capacitor functions as the output terminal of the voltage conversion unit;
   wherein in response to the first electronic switch being turned on, the driver chip operates, and the output terminal of the voltage conversion unit outputs the operational voltage; and
   wherein in response to the first electronic switch being turned off, the driver chip does not operate, and the output terminal of the voltage conversion unit does not output the operational voltage.

3. The power supply circuit of claim 2, wherein the voltage conversion module further comprises a second capacitor and a third resistor; and the driver chip further comprises a phase pin electrically connected to the third terminal of the second electronic switch, and a bootstrap pin electrically connected to the phase pin through the third resistor and the second capacitor in that order.

4. The power supply circuit of claim 3, wherein each of the second electronic switch and the third electronic switch is an n-channel metal-oxide semiconductor field-effect transistor (NMOSFET), and the first terminal, the second terminal, and the third terminal of each of the second electronic switch and the third electronic switch are respectively corresponding to a gate, a drain, and a source of the NMOSFET.

5. The power supply circuit of claim 1, wherein the under voltage protection module further comprises a third resistor, the first terminal of the first electronic switch is electrically connected to the output terminal of the comparator through the third resistor.

6. The power supply circuit of claim 5, wherein the first electronic switch is a pnp-type bipolar junction transistor (BJT), and the first terminal, the second terminal, and the third terminal of the first electronic switch are respectively corresponding to a base, an emitter, and a collector of the pnp-type BJT.

7. The power supply circuit of claim 1, wherein the voltage stabilizing unit comprises a third resistor, a fourth resistor, a fifth resistor, and a Zener diode, the Zener diode comprises an anode electrically connected to a ground, and a cathode electrically connected to the second power supply through the third resistor and electrically connected to a ground through the fourth resistor and the fifth resistor in that order, and a node between the fourth resistor and the fifth resistor functions as an output terminal of the voltage stabilizing unit, to output the reference voltage to the non-inverting terminal of the comparator.

* * * * *